US010616339B2

(12) United States Patent
Nagalla et al.

(10) Patent No.: US 10,616,339 B2
(45) Date of Patent: Apr. 7, 2020

(54) SYSTEM AND METHOD TO CONFIGURE, MANAGE, AND MONITOR STACKING OF ETHERNET DEVICES IN A SOFTWARE DEFINED NETWORK

(71) Applicant: DELL PRODUCTS, LP, Round Rock, TX (US)

(72) Inventors: Srinivasa Rao Nagalla, Round Rock, TX (US); Rabah Hamdi, Jonestown, TX (US)

(73) Assignee: Dell Products, L.P., Round Rock, TX (US)

( * ) Notice: Subject to any disclaimer, the term of this patent is extended or adjusted under 35 U.S.C. 154(b) by 42 days.

(21) Appl. No.: 15/824,728

(22) Filed: Nov. 28, 2017

(65) Prior Publication Data

US 2019/0166199 A1 May 30, 2019

(51) Int. Cl.
*H04L 29/08* (2006.01)
*H04L 12/803* (2013.01)
*H04L 29/06* (2006.01)

(52) U.S. Cl.
CPC ........ *H04L 67/1097* (2013.01); *H04L 47/125* (2013.01); *H04L 69/161* (2013.01); *H04L 67/1008* (2013.01); *H04L 69/32* (2013.01)

(58) Field of Classification Search
CPC .................................................. H04L 67/1097
USPC .......................................................... 709/229
See application file for complete search history.

(56) References Cited

U.S. PATENT DOCUMENTS

| | | | |
|---|---|---|---|
| 7,687,419 B2 * | 3/2010 | Kawai | C03C 3/091 428/846.9 |
| 8,499,012 B1 | 7/2013 | Mittal | |
| 8,995,302 B1 * | 3/2015 | Brown | H04L 49/00 370/254 |
| 9,178,801 B1 * | 11/2015 | Guichard | H04L 12/6418 |
| 2008/0275975 A1 * | 11/2008 | Pandey | H04L 49/40 709/223 |

(Continued)

FOREIGN PATENT DOCUMENTS

EP     2 273 375 B1     2/2012

OTHER PUBLICATIONS

Allied Telesis, "The OpenFlow Protocol Feature Overview and Configuration Guide", 2017 (Year: 2017).*

(Continued)

*Primary Examiner* — Ondrej C Vostal
(74) *Attorney, Agent, or Firm* — Larson Newman, LLP

(57) ABSTRACT

An information handling system for managing a network includes a first stackable network switch, a second stackable network switch, and a hardware switching management controller. The first stackable network switch includes a first configuration setting to enable the first stackable network switch to operate in a switch stack. The first configuration setting is accessible via an OpenFlow protocol. The second stackable network switch includes a second configuration setting to enable the second stackable network switch to operate in the switch stack. The second configuration setting is accessible via the OpenFlow protocol. The hardware switching management controller includes an OpenFlow stacking manager configured to set the first configuration setting and the second configuration setting such that the switch stack includes the first and second stackable network switches.

18 Claims, 6 Drawing Sheets

(56) References Cited

U.S. PATENT DOCUMENTS

| | | |
|---|---|---|
| 2010/0057932 A1 | 3/2010 | Pope et al. |
| 2013/0136124 A1* | 5/2013 | Chuang ................. H04L 47/781 370/392 |
| 2013/0208521 A1* | 8/2013 | Trainer .................... H02J 3/36 363/126 |
| 2013/0268686 A1* | 10/2013 | Wang .................. H04L 65/1069 709/228 |
| 2014/0153568 A1* | 6/2014 | Gasparakis ........... H04L 5/0058 370/389 |
| 2014/0198686 A1* | 7/2014 | Kamble ................ H04L 41/044 370/255 |
| 2014/0280775 A1 | 9/2014 | Wood et al. |
| 2014/0307580 A1* | 10/2014 | Fung .................... H04L 49/351 370/254 |
| 2015/0124815 A1* | 5/2015 | Beliveau ................ H04L 45/38 370/392 |
| 2015/0208336 A1* | 7/2015 | Iihoshi .................. H04W 48/18 455/435.2 |
| 2015/0223104 A1* | 8/2015 | Xu .................... H04W 28/0231 370/353 |
| 2016/0173104 A1* | 6/2016 | Vassiliev .......... H03K 19/17736 326/41 |
| 2016/0197831 A1* | 7/2016 | De Foy ............... H04L 45/7453 370/392 |
| 2016/0254995 A1* | 9/2016 | Wang ...................... H04L 45/54 370/392 |
| 2016/0261491 A1* | 9/2016 | Gebhard ............... H04L 41/042 |
| 2016/0261492 A1* | 9/2016 | Xiao ................... H04L 41/0686 |
| 2016/0373441 A1* | 12/2016 | Sirivara ............... H04L 63/0869 |
| 2017/0142034 A1* | 5/2017 | K ............................ H04L 1/188 |
| 2017/0171113 A1* | 6/2017 | Chanda .................. H04L 49/70 |
| 2017/0180225 A1* | 6/2017 | Sampath ............. H04L 12/6418 |
| 2017/0214609 A1* | 7/2017 | Fujii ................... H04L 12/4641 |
| 2017/0317922 A1* | 11/2017 | Livak ...................... H04L 45/26 |
| 2017/0366605 A1* | 12/2017 | Chang ..................... H04L 47/70 |
| 2018/0287966 A1* | 10/2018 | Kamath .............. H04L 12/4641 |
| 2018/0337848 A1* | 11/2018 | Bhaskar ............. H04L 12/6418 |

OTHER PUBLICATIONS

Badra et al., "Using the NETCONF Protocol over Transport Layer Security (TLS) with Mutual X.509 Authentication", RFC 7589, 2015 (Year: 2015).*

Bierman et al., "Network Configuration Protocol (NETCONF) Access Control Model", RFC6536, 2012 (Year: 2012).*

Cejka et al., "Configuration of Open vSwitch Using OF-CONFIG", 2016 (Year: 2016).*

Enns, "NETCONF Configuration Protocol", RFC4741, 2006 (Year: 2006).*

Enns et al., "Network Configuraittn Protocol (NETCONF)", RFC6241, 2011 (Year: 2011).*

Jacobs, "OpenFlow configuration protocols: Understanding OF-Config and OVSDB", 2013 (Year: 2013).*

Narisetty et al., "OpenFlow Configuration (OFConfig) Protocol: Implementation for the OF Management Plane", 2013 (Year: 2013).*

ONF, Open Networking Foundation, "OpenFlow Management and Configuration Protocol (OF-Config 1.1)", ONF TS-005, Version 1.1, 2012 (Year: 2012).*

ONF, Open Networking Foundation, "OF-Config 1.2 OpenFlow Management and Configuration Protocol", ONF TS-016, 2014 (Year: 2014).*

ONF, Open Networking Foundation, "OpenFlow Switch Specification", Version 1.3.1, ONF TS-007, 2012 (Year: 2012).*

Onf, Open Networking Foundation, "OpenFlow Table Type Patterns", Version 1.0, ONF TS-017, 2014 (Year: 2014).*

PacketPimp3, "What is OpenFlow?", 2017 (Year: 2017).*

Pfaff et al., "The Open vSwitch Database Management Protocol", RFC7047, 2013 (Year: 2013).*

\* cited by examiner

SYSTEM AND METHOD TO CONFIGURE, MANAGE, AND MONITOR STACKING OF ETHERNET DEVICES IN A SOFTWARE DEFINED NETWORK

FIELD OF THE DISCLOSURE

This disclosure generally relates to information handling systems, and more particularly relates to configuring, managing, and monitoring of stacked Ethernet devices in a software defined network.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include two stackable network switches and a hardware switching management controller. The first stackable network switch may include a first configuration setting to enable the first stackable network switch to operate in a switch stack. The first configuration setting may be accessible via an OpenFlow protocol. A second stackable network switch may include a second configuration setting to enable the second stackable network switch to operate in the switch stack. The second configuration setting may be accessible via the OpenFlow protocol. The hardware switching management controller may include an OpenFlow stacking manager configured to set the first configuration setting and the second configuration setting such that the switch stack includes the first and second stackable network switches.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
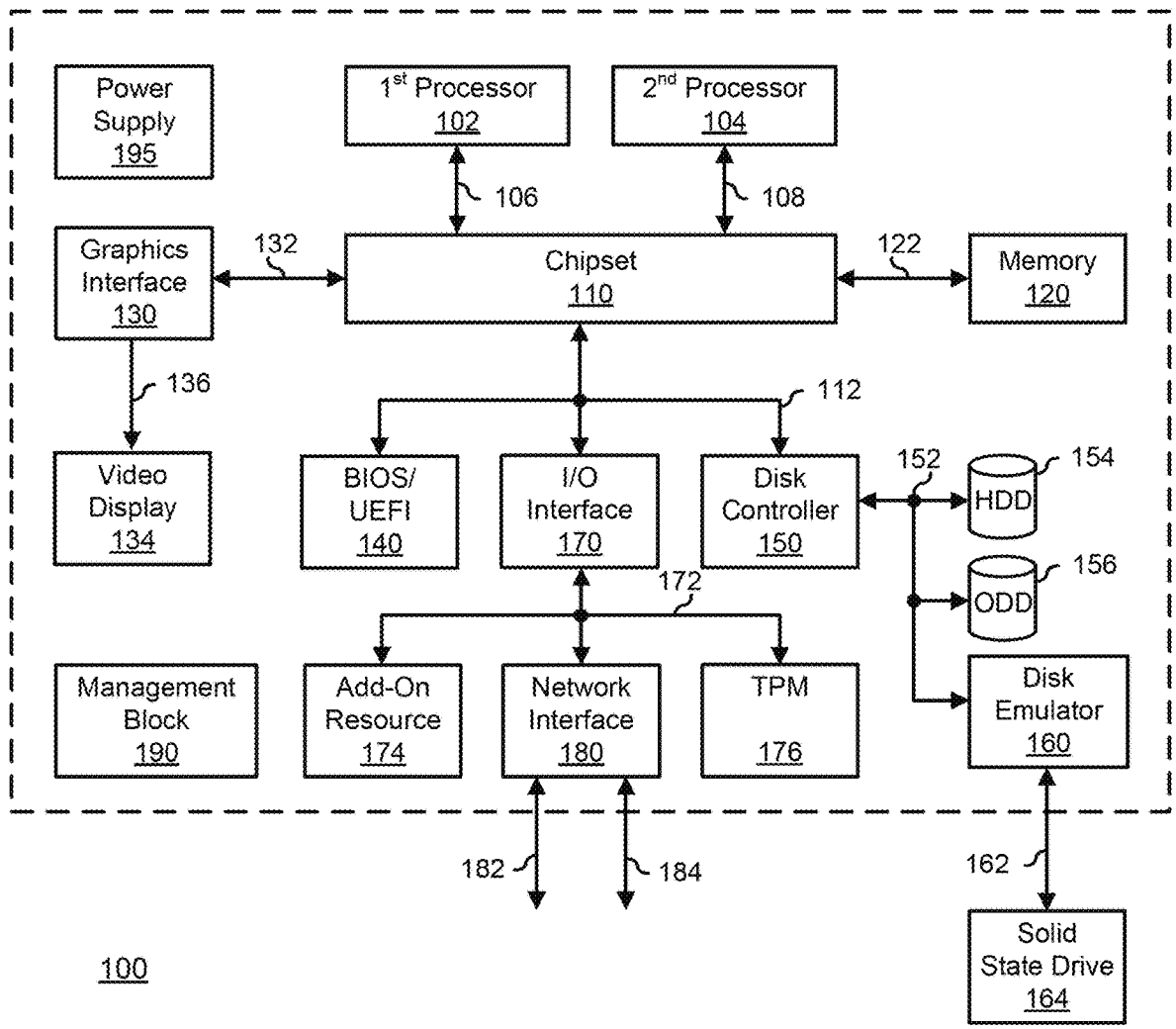
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/universal extensible firmware interface (BIOS/UEFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/UEFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 140 includes BIOS/UEFI code operable to detect resources within information handling system 100, to provide drivers for the resources, initialize the resources, and access the resources. BIOS/UEFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
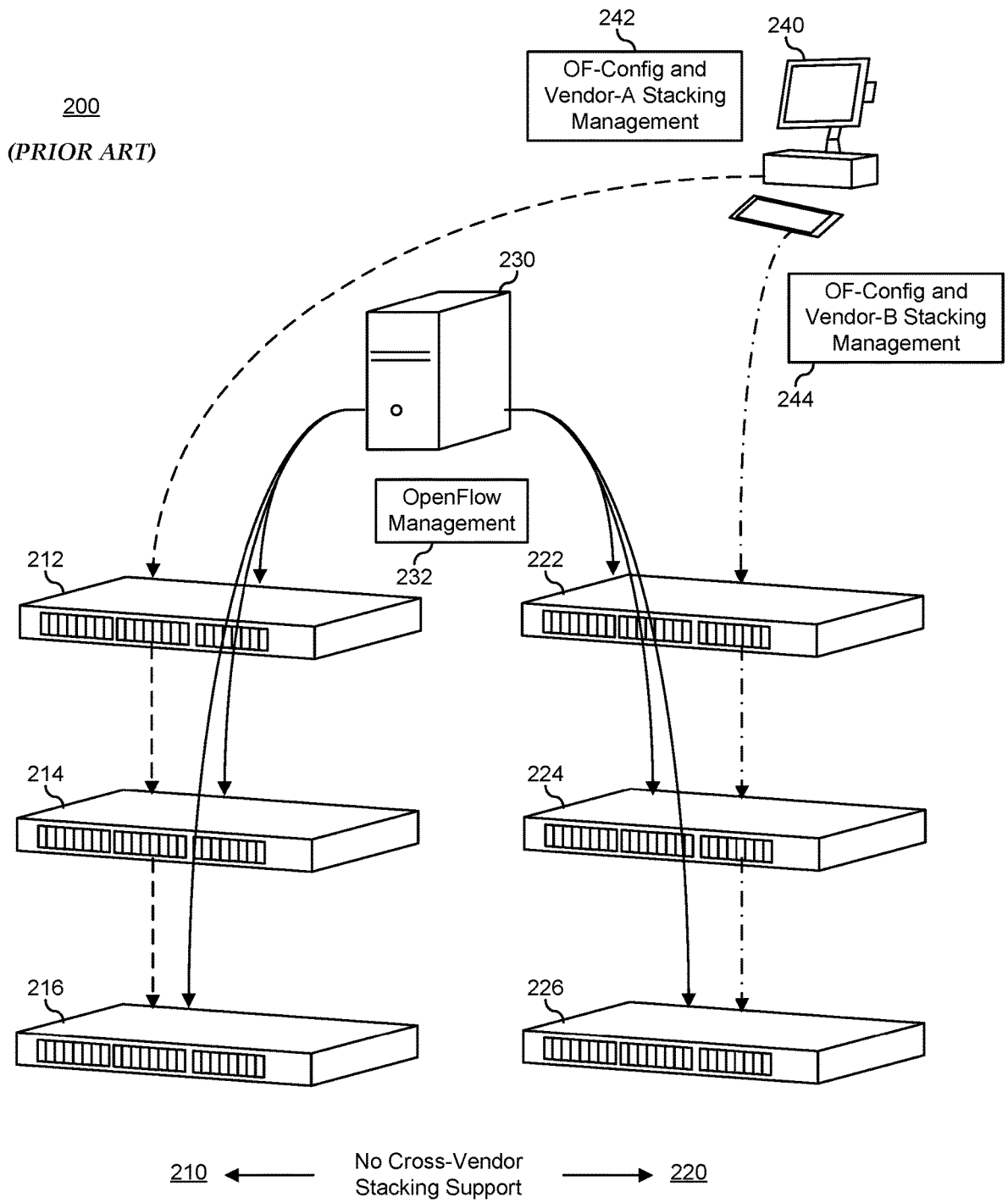
FIG. 2 is a block diagram illustrating a network management system.

FIG. 2 illustrates a network management system 200 as is known in the art. Network management system 200 includes a switch stack 210, a switch stack 220, a switching management system 230 and a switch management system 240. Switch stack 210 includes stackable network switches 212, 214, and 216, and switch stack 220 includes stackable network switches 222, 224, and 226. Network management system 200 represents physical network switching elements such as stackable network switches 212, 214, 216, 222, 224, and 226, and one or more additional switch elements or stackable switches that provide highly dense switching functionality for a data processing system such as a data center.

Stackable switches 212, 214, 216, 222, 224, and 226 represent physical network switching elements that can operate as stand alone network switching elements, but can also operate together with each other to provide a network switching element with the characteristics of a single network switching element, but with the port capacity of all of the stackable switches together. For example, if each of stackable network switches 212, 214, and 216 provide 48 network ports, then, operating as a network switch stack, switch stack 210 provides 144 network ports. In particular, when operating as stand alone network switching elements, stackable network switches 212, 214, and 216 may each be configured with a different IP address for the purposes of network switching management and for management of the stackable network switches themselves. In contrast, when stackable network switches 212, 214, and 216 operate together as switch stack 210 they may be configured with a single IP address that provides for management access to the switch stack for network switching management and for stackable network switch management. Similarly, stackable network switches 222, 224, and 226 may operate as stand alone network switch elements where each is configured with a different IP address for the purposes of network switching management and for management of the stackable network switches themselves, or may operate together as a switch stack 220 that is configured with a single IP address that provides for management access to the switch stack for network switching management and for stackable network switch management. Switch stack 210 is distinguished from switch stack 220 in that stackable network switches 212, 214, and 214 are not able to form a stacked switch with stackable network switches 222, 224, and 226. For example, switch stacks 210 and 220 may be provided by different vendors that do not provide interoperability with each other.

As used herein, switching management refers to the management and control of the switching functions of the respective stackable network switches, for example, as may be defined by the data plane and control plane functions of the stackable network switches. Examples of switching management include routing table management and exchange, access control list management and exchange, maintenance of topology information as may be provided by various routing protocols such as OSPF, IS-IS, RIP, BGP, and the like, and other activities that pertain to the switching functions of the stackable network switches. As further used herein, switch management refers to the management of the stackable network switches themselves, such as port configuration management including enabling and disabling port ranges, link bandwidth and duplex settings, port priority settings, switch firmware management, and the like. In particular, the configuration of stackable network switches to operate as a switch stack is a function of switch management, rather than of switching management.

Network management system 200 operates to implement a Software Defined Network (SDN) on switch stacks 210 and 220 to provide dynamic and scalable network switching operations to meet the demands of highly virtualized computing and storage environments of a data center. The SDN provides a direct view into the operations of switch stacks 210 and 220, enables the programmability of the switching functions by abstracting the control layer functions to a centrally managed resource. Here, switching management system 230 operates to provide the SDN functionality on network management system 200. As such, stackable network switches 212, 214, 214, 222, 224, and 226 and switching management system 230 implement an open standards-based and vendor-neutral operating environment for enabling the SDN. An example of an open standards-based and vendor-neutral operating environment includes tools and applications for implementing the OpenFlow protocol. Here, switching management system 230 is shown as including an OpenFlow management module 232 to provide switching management on stackable network switches 212, 214, 216, 222, 224, and 226 in accordance with the OpenFlow protocol. However, OpenFlow management module 232 does not provide switch management functions, such as the configuration of stackable network switches 212, 214, and 216 into switch stack 210, or the configuration of stackable network switches 222, 224, and 226 into switch stack 220. Instead, OpenFlow management module 232 can only access stackable network switches 212, 214, 216, 222, 224, and 226 as stand alone network switches, each with its own IP address.

Switch management system 240 provides switch management functions for stackable switches 212, 214, 216, 222, 224, and 226. In particular, switch management system 240 operates in accordance with an OpenFlow Management and Configuration (OF-Config) protocol to provide switch management function such as port configuration management including enabling and disabling port ranges, link bandwidth and duplex settings, port priority settings, switch firmware management, and the like. Further, switch management system 240 operates in accordance with various vendor specific management applications to provide stacking management of switch stacks 210 and 220. Here, switch management system 240 is illustrated as providing switch management to switch stack 210 utilizing OF-Config and a first vendor specific management application 242, and to switch stack 220 utilizing OF-Config and a second, different, vendor specific management application 244.

Figure 3:
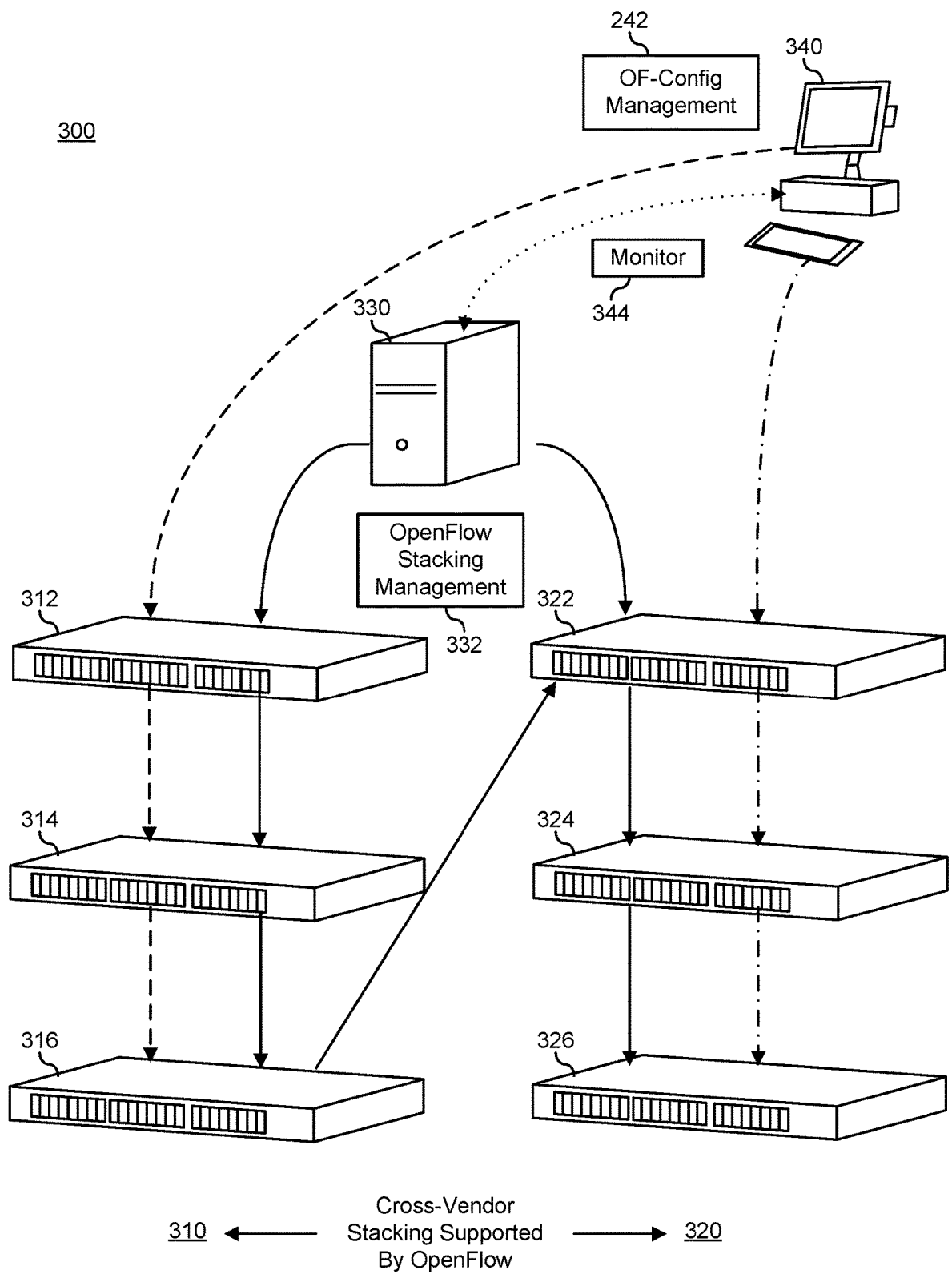
FIG. 3 is a block diagram illustrating a network management system.

FIG. 3 illustrates a network management system 300 according to the present disclosure. Network management system 300 includes a switch stack 310, a switch stack 320, a switching management system 330 and a switch management system 340. Switch stack 310 includes stackable network switches 312, 314, and 316, and switch stack 320 includes stackable network switches 322, 324, and 326. Network management system 300 represents physical network switching elements such as stackable network switches 312, 314, 316, 322, 324, and 326, and one or more additional switch elements or stackable switches that provide highly dense switching functionality for a data processing system such as a data center.

Stackable switches 312, 314, 316, 322, 324, and 326 represent physical network switching elements that can operate as stand alone network switching elements, but can also operate together with each other to provide a network switching element with the characteristics of a single network switching element, but with the port capacity of all of the stackable switches together. For example, if each of stackable network switches 312, 314, and 316 provide 48 network ports, then, operating as a network switch stack, switch stack 310 provides 144 network ports. In particular, when operating as stand alone network switching elements, stackable network switches 312, 314, and 316 may each be configured with a different IP address for the purposes of network switching management and for management of the stackable network switches themselves. In contrast, when stackable network switches 312, 314, and 316 operate together as switch stack 310 they may be configured with a single IP address that provides for management access to the switch stack for network switching management and for stackable network switch management. Similarly, stackable network switches 322, 324, and 326 may operate as stand alone network switch elements where each is configured with a different IP address for the purposes of network switching management and for management of the stackable network switches themselves, or may operate together as a switch stack 320 that is configured with a single IP address that provides for management access to the switch stack for network switching management and for stackable network switch management. However, here, switch stacks 310 and 320 operate in accordance with an enhanced OpenFlow protocol that includes stacking management functions. As such, stackable network switches 312, 314, and 314 are able to form a stacked switch with stackable network switches 322, 324, and 326, even if switch stacks 310 and 320 are provided by different vendors that may not otherwise provide interoperability with each other.

Network management system 300 operates to implement a Software Defined Network (SDN) on switch stacks 310 and 320 to provide dynamic and scalable network switching operations to meet the demands of highly virtualized computing and storage environments of a data center. The SDN provides a direct view into the operations of switch stacks 310 and 320, enables the programmability of the switching functions by abstracting the control layer functions to a centrally managed resource. Here, switching management system 330 operates to provide the SDN functionality on network management system 300. As such, stackable network switches 312, 314, 314, 322, 324, and 326 and switching management system 330 implement an open standards-based and vendor-neutral operating environment for enabling the SDN. An example of an open standards-based and vendor-neutral operating environment includes tools and applications for implementing the OpenFlow protocol. Here, switching management system 330 is shown as including an OpenFlow management module 332 to provide switching management on stackable network switches 312, 314, 316, 322, 324, and 326 in accordance with the OpenFlow protocol. Here, OpenFlow management module 332 provides stack management functions to configuration stackable network switches 312, 314, 316, 322, 324, and 326 into switch stacks 310 and 320, or into a single unified switch stack, as needed or desired. Thus, OpenFlow management module 332 can access stackable network switches 312, 314, 316, 322, 324, and 326 utilizing a single IP address.

Switch management system 340 provides switch management functions for stackable switches 312, 314, 316, 322, 324, and 326, with the exception of the stack management functions that are now handled by switching management system 330. In particular, switch management system 340 operates in accordance with the OpenFlow Management and Configuration (OF-Config) protocol to provide switch management function such as port configuration management including enabling and disabling port ranges, link bandwidth and duplex settings, port priority settings, switch firmware management, and the like. Here, switch management system 340 is illustrated as providing switch management to switch stacks 310 and 320 utilizing OF-Config application 342.

Figure 4:
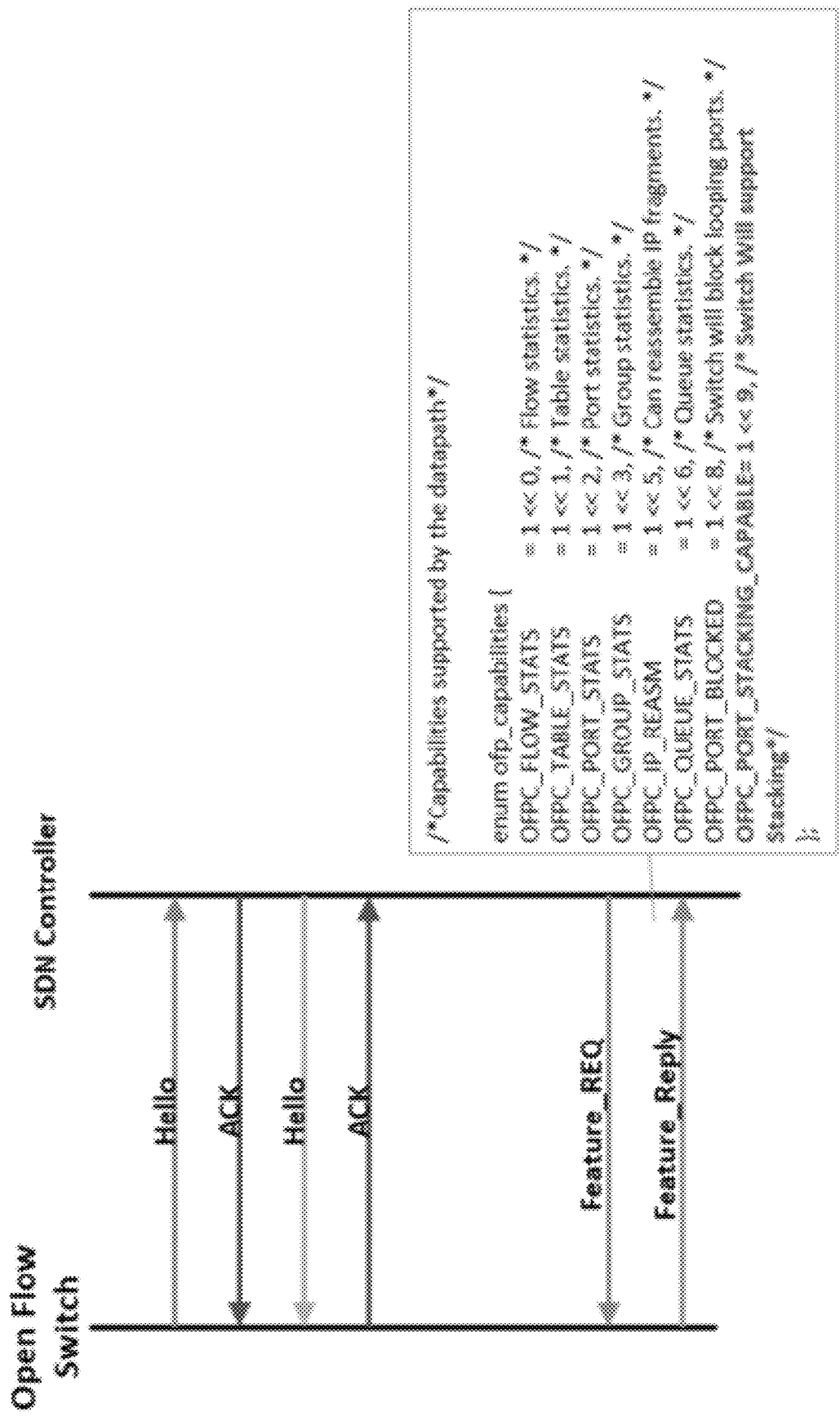
FIGS. 4-6 illustrate various OpenFlow transactions for an enhanced OpenFlow protocol according to embodiments of the present disclosure.
Figure 5:
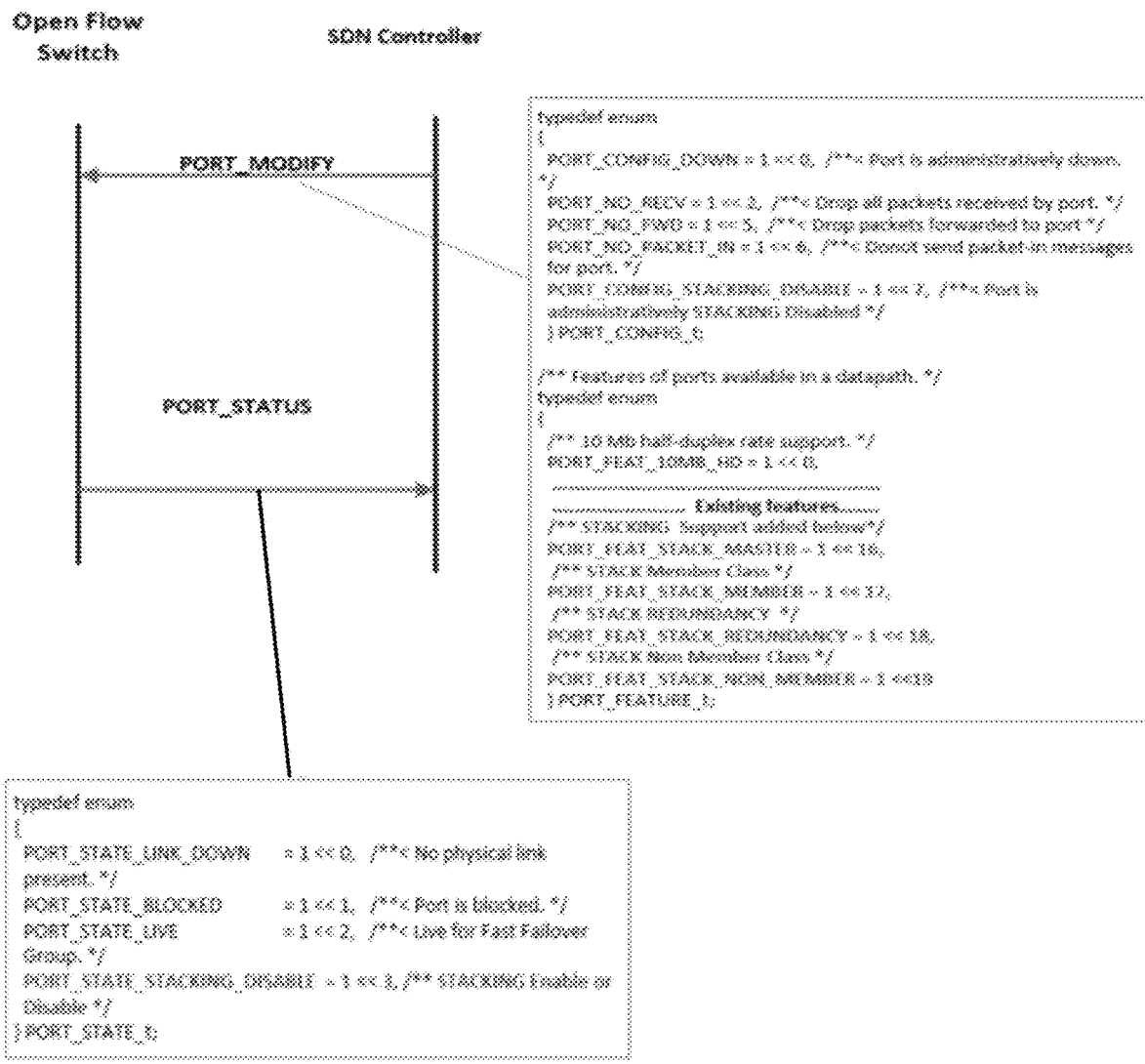
Figure 6:
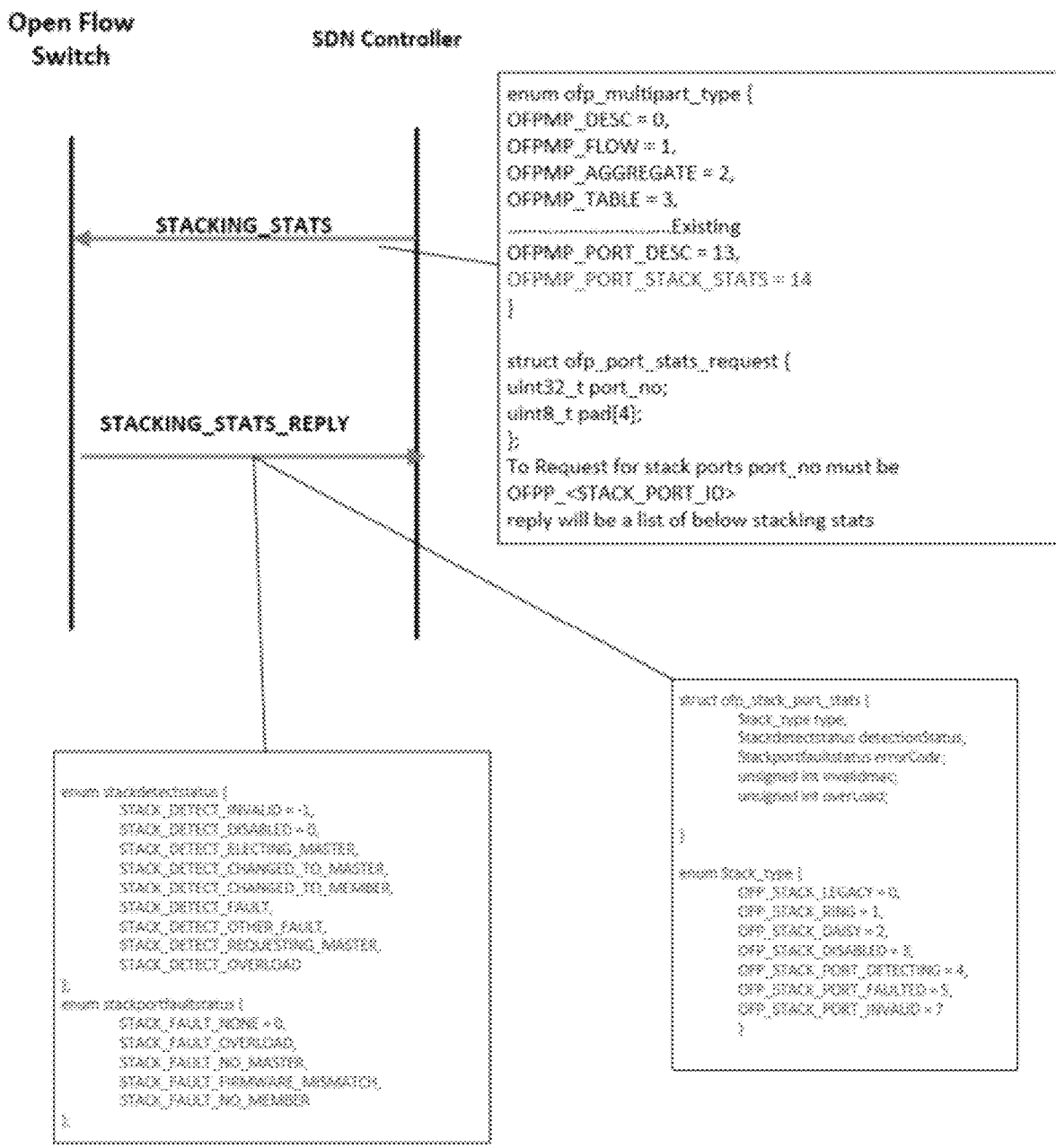

FIGS. 4-6 illustrate various OpenFlow transactions for an enhanced OpenFlow protocol that enables stacking control of stackable network switches. In particular, FIG. 4 illustrates an enhanced OpenFlow protocol handshake and feature request and reply between an enhanced OpenFlow switching management system and an enhanced OpenFlow stackable network switch. In particular, after the enhanced OpenFlow switching management system and the enhanced OpenFlow stackable network switch exchange HELLO and Acknowledge message, the enhanced OpenFlow switching management system issues a feature request to the enhanced OpenFlow stackable network switch. Here, in addition to requesting and receiving flow statistics, table statistics, port statistics, group statistics, IP fragment reassemble settings, queue statistics, and loop blocking status, the enhanced OpenFlow protocol provides for requesting and receiving stacking information as to whether or not a particular network switch supports switch stacking.

FIG. 5 illustrates an enhanced OpenFlow protocol port modify request and port status reply between an enhanced OpenFlow switching management system and an enhanced OpenFlow stackable network switch. In particular, the enhanced OpenFlow switching management system issues a modify request to the enhanced OpenFlow stackable network switch. Here, in addition to requesting to modify a port's down state and other port states, the enhanced OpenFlow protocol provides for requesting to modify the switch's stacking enabled/disabled state, and can define stacking port features, such as adding a port to a stacking class, defining a port as a redundancy port on the stack, or defining the port as a non-member of the stack. The enhanced OpenFlow stackable network switch can reply with port status such as whether or not a link is down, a port is blocked, or is live for a failover mode. In addition, the enhanced OpenFlow protocol provides for the enhanced OpenFlow stackable network switch to reply with port status as to whether or not a port is enabled for stacking.

FIG. 6 illustrates an enhanced OpenFlow protocol stacking status request and a stacking status reply between an enhanced OpenFlow switching management system and an enhanced OpenFlow stackable network switch. The reply includes detection of a stack and associated status, stacked port status, and stack type status.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system for managing a network, the information handling system comprising:
   a first stackable network switch including a first configuration setting to enable the first stackable network switch to operate in a switch stack, wherein the first configuration setting is accessible via an OpenFlow protocol;
   a second stackable network switch including a second configuration setting to enable the second stackable network switch to operate in the switch stack, wherein the second configuration setting is accessible via the OpenFlow protocol; and
   a hardware switching management controller configured to set the first configuration setting and the second configuration setting such that the switch stack includes the first and second stackable network switches, wherein in setting the first configuration setting, the switching management controller is further configured to send an OpenFlow port modify command to the first stackable network switch, the OpenFlow port modify command enabling the first stackable network switch to operate in the switch stack, and identifying the second stackable network switch as a member of the switch stack.

2. The information handling system of claim 1, wherein in setting the first configuration setting, the switching management controller is further configured to send an OpenFlow feature request to the first stackable network switch.

3. The information handling system of claim 2, wherein in response to the OpenFlow feature request the first network switch is further configured to respond with an OpenFlow feature reply that indicates that the first stackable network switch includes the first configuration setting.

4. The information handling system of claim 1, wherein in response to the OpenFlow port modify command the first network switch is further configured to respond with an OpenFlow port status reply that indicates that the first stackable network switch is enabled to operate in the switch stack and that the second stackable network switch is a member of the switch stack.

5. The information handling system of claim 1, wherein in setting the first configuration setting, the switching management controller is further configured to send an OpenFlow stacking status request to the first stackable network switch.

6. The information handling system of claim 5, wherein in response to the OpenFlow stacking status request the first network switch is further configured to respond with an OpenFlow stacking status status reply that indicates a condition of the switch stack.

7. The information handling system of claim 1, wherein the first and second stackable network switches are from a common vendor.

8. The information handling system of claim 1, wherein the first and second stackable network switches are from different vendors.

9. A method for managing a network, the method comprising:
   configuring a hardware switching management controller to instantiate an OpenFlow switching manager;
   setting, by the OpenFlow switching manager, a first configuration setting of a first stackable network switch, the first configuration setting to enable the first stackable network switch to operate in a switch stack, wherein the first configuration setting is accessible via an OpenFlow protocol; and
   setting, by the OpenFlow switching manager, a second configuration setting of a second stackable network switch, the second configuration setting to enable the second stackable network switch to operate in the switch stack, wherein the second configuration setting is accessible via the OpenFlow protocol;
   wherein setting the first configuration setting further includes sending, by the OpenFlow switching manger, an OpenFlow stacking status request to the first stackable network switch.

10. The method of claim 9, wherein, in setting the first configuration setting, the method further comprises:
    sending, by the OpenFlow switching manager, an OpenFlow feature request to the first stackable network switch.

11. The method of claim 10, wherein, in response to the OpenFlow feature request, the method further comprises:
    responding, by the first network switch, with an OpenFlow feature reply that indicates that the first stackable network switch includes the first configuration setting.

12. The method of claim 9, wherein, in setting the first configuration setting, the method further comprises:
    sending, by the OpenFlow switching manager, an OpenFlow port modify command to the first stackable network switch, the OpenFlow port modify command enabling the first stackable network switch to operate in the switch stack, and identifying the second stackable network switch as a member of the switch stack.

13. The method of claim 12, wherein, in response to the OpenFlow port modify command, the method further comprises:
    responding, by the first network switch, with an OpenFlow port status reply that indicates that the first stackable network switch is enabled to operate in the switch stack and that the second stackable network switch is a member of the switch stack.

14. The method of claim 9, wherein, in response to the OpenFlow stacking status request, the method further comprises:
    responding, by the first network switch, with an OpenFlow stacking status status reply that indicates a condition of the switch stack.

15. The method of claim 9, wherein the first and second stackable network switches are from a common vendor.

16. The method of claim 9, wherein the first and second stackable network switches are from different vendors.

17. An information handling system for managing a network, the information handling system comprising:
- a stackable network switch including a first configuration setting to enable the first stackable network switch to operate in a switch stack and a second configuration setting to configure a port of the stackable network switch, wherein the first configuration setting is accessible via an OpenFlow protocol and wherein the second configuration setting is accessible via an OpenFlow Management and Configuration (OF-Config) protocol;
- a hardware switching management controller configured to set the first configuration setting such that the switch stack includes the stackable network switch; and
- a hardware switching management controller including an OF-Config manager configured to set the second configuration setting, wherein in setting the first configuration setting, the switching management controller is further configured to send an OpenFlow stacking status request to the stackable network switch.

18. The information handling system of claim 17, wherein, in response to an OpenFlow port modify command from the hardware switching management controller, the stackable network switch is further configured to respond with an OpenFlow port status reply that indicates that the stackable network switch is enabled to operate in the switch stack.

\* \* \* \* \*